United States Patent
Frattarelli et al.

(10) Patent No.: US 10,717,921 B2
(45) Date of Patent: Jul. 21, 2020

(54) CO-SURFACTANT FOAM-FORMING COMPOSITION FOR ENHANCED OIL RECOVERY

(71) Applicants: Dow Global Technologies LLC, Midland, MI (US); Rohm and Haas Company, Collegeville, PA (US)

(72) Inventors: David L. Frattarelli, Pottstown, PA (US); Joydeep Mukherjee, Missouri City, TX (US); Susan K. Falcone-Potts, Clute, TX (US); Martha Hernandez, Lake Jackson, TX (US); Troy E. Knight, Missouri City, TX (US); Pramod D. Patil, Sugar Land, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/554,891

(22) PCT Filed: Apr. 28, 2016

(86) PCT No.: PCT/US2016/029658
§ 371 (c)(1),
(2) Date: Aug. 31, 2017

(87) PCT Pub. No.: WO2016/176385
PCT Pub. Date: Nov. 3, 2016

(65) Prior Publication Data
US 2018/0037809 A1 Feb. 8, 2018

Related U.S. Application Data

(60) Provisional application No. 62/155,163, filed on Apr. 30, 2015.

(51) Int. Cl.
*C09K 8/594* (2006.01)
*E21B 43/16* (2006.01)
(Continued)

(52) U.S. Cl.
CPC .............. *C09K 8/594* (2013.01); *C09K 8/584* (2013.01); *E21B 43/16* (2013.01); *E21B 43/164* (2013.01); *E21B 43/20* (2013.01)

(58) Field of Classification Search
None
See application file for complete search history.

(56) References Cited

U.S. PATENT DOCUMENTS 2,623,596 A 12/1952 Whorton et al.
3,065,790 A 11/1962 Holm
(Continued)

FOREIGN PATENT DOCUMENTS

EP 0032072 A1 7/1981
WO 90/07989 A1 7/1990

*Primary Examiner* — Jeffrey D Washville

(57) ABSTRACT

The present invention includes a foam-forming composition for use in enhanced oil recovery, and a method of using said foam-forming composition for recovering oil. The foam-forming composition of the present invention comprises a nonionic surfactant, in particular an alcohol-alkoxylate, and an anionic surfactant, in particular an alkyl diphenyloxide (di)sulfonate, where the foam-forming composition promotes a formation of a stable foam formed of a $CO_2$ and water.

8 Claims, 1 Drawing Sheet

(51) Int. Cl.
*E21B 43/20* (2006.01)
*C09K 8/584* (2006.01)

(56) References Cited

U.S. PATENT DOCUMENTS

| | | |
|---|---|---|
| 3,529,668 A | 9/1970 | Bernard |
| 4,380,266 A | 4/1983 | Wellington |
| 4,860,828 A | 8/1989 | Oswald et al. |
| 5,203,411 A * | 4/1993 | Dawe ................ C09K 8/58 166/268 |
| 5,502,538 A | 3/1996 | Ogasawara |
| 2014/0251607 A1 * | 9/2014 | Sanders ............. C09K 8/584 166/270.2 |

* cited by examiner

CO-SURFACTANT FOAM-FORMING COMPOSITION FOR ENHANCED OIL RECOVERY

FIELD OF THE INVENTION

This invention relates to a surfactant foam-forming composition and method of use thereof for foam enhanced oil recovery process. Specifically, the co-surfactant foam-forming composition comprises a nonionic surfactant and an anionic surfactant. Preferably the nonionic surfactant is an alcohol-alkoxylate and the anionic surfactant is an alkyl diphenyloxide (di)sulfonate.

BACKGROUND OF THE INVENTION

The present invention relates to a composition and method for enhancing the recovery of petroleum from an oil-bearing formation.

In the recovery of oil from reservoirs, the use of primary production techniques (i.e., the use of only the initial reservoir pressure to recover the crude oil) followed by the secondary recovery technique of waterflooding, recovers only a portion of the original oil present in the formation. Moreover, the use of certain tertiary enhanced oil recovery (EOR) techniques is also known in the art. These tertiary recovery techniques involve injection of any suitably tailored composition of fluids for e.g., water with tailored salinity, re-injection of hydrocarbon gases produced from the formation, injection of gases like $CO_2$, nitrogen, air, or in cases of heavy oil thermal methods can be used by increasing the enthalpy of injected fluid e.g., utilizing steam, and injection of chemicals like surfactants and polymers to enhance performance of any of these recovery techniques.

A typical procedure that has been implemented over several decades involve cyclic injections of alternating slugs of high viscosity fluids such as water followed by a slug of gas such as $CO_2$, for example, the discussion in U.S. Pat. No. 2,623,596. Moreover, U.S. Pat. No. 3,065,790 indicates that this process may be more cost effectively employed if the slug of $CO_2$ is relatively small. In fact, as illustrated by U.S. Pat. No. 3,529,668, this type of recovery procedure is typically performed in "water alternating gas (WAG)" cycles. However WAG strategy is effective only in the initial stages of gas flooding. Volumetric sweep inefficiencies arise, typically as a result of viscous fingering, reservoir heterogeneity and gravity segregation. Due to its low viscosity, gases like $CO_2$ establish a preferentially connected pathway and sweeps mostly through high permeability zones in a reservoir with heterogeneous permeability distribution. Gravity segregation occurs when gas due to its low density, segregates from the water front and preferentially sweeps the top section of a reservoir. A substantial volume of upswept oil is bypassed as a result of these effects.

One proposed solution to this problem associated with the channeling of the gas bypassing the oil, is the injection of water which contains a surfactant alternating or co-injecting with the gas. The process is referred to as foam EOR. In particular, surfactants have been proposed as a means for generating a foam or an emulsion in the formation. See, for example, U.S. Pat. Nos. 4,380,266; 4,860,828; and 5,502,538. The purpose of this foam is to divert the flow of the $CO_2$ into that portion of the formation containing high oil saturation.

The surfactants used in foam EOR processes, however, have suffered from a number of drawbacks. It has been shown that adsorption of surfactants accounts for one of the major losses of the surfactant. Excessive adsorption hampers the transport of surfactant into far field and thus its availability to form foam deep into the reservoir. Anionic surfactants adsorb heavily on carbonate rocks while nonionic surfactants adsorb on sandstone rocks. Furthermore, the surfactant must be stable in the formation brine and should not form a separate misceller phase which may limit the transport of the surfactant in the reservoir.

Many prior art surfactants for example, alpha-olefin sulphonate surfactants, largely known as "good foamers", are known to suffer from numerous stability issues, for example solubility issues in some brine solutions as well as instability of the surfactant stabilized foam in the presence of oil especially at higher temperatures. More specifically, for $CO_2$ flooding process it has been shown that the most efficient method of transport and implementation of foam EOR process happens if the surfactants partitions and gets transported along with the $CO_2$ phase. While some conventional anionic surfactants, such as alpha-olefin sulphonates, adsorb less on sandstone and can form foams at certain reservoir conditions, they cannot be transported along with $CO_2$. Nonionic surfactants can be transported through the $CO_2$ phase but they have excessive adsorption on sandstones, adversely affecting the feasibility of the foam EOR implementation.

There remains a need for suitable foam-forming composition, especially sandstone formations, comprising foaming agents which will allow enhanced oil recovery in an efficient manner. In particular, there is a need for suitable foam-forming composition comprising foaming agents which have a reduced tendency to adsorb in rock formations, with ability of active foaming components that can be transported through $CO_2$, demonstrate improved brine and temperature tolerance and enhanced stability in presence of crude oil.

SUMMARY OF THE INVENTION

The present invention is a foam-forming composition and method of use for an enhanced oil recovery process wherein the composition comprises a nonionic surfactant and an anionic surfactant (i) wherein the nonionic surfactant is one or more alcohol-alkoxylate having the formula:

$$RO-(CR^1R^2R^3R^4O)_x(C_2H_4O)_y-H$$

where R is selected from the group of linear alkyl, branched alkyl, cyclic alkyl, and alkaryl groups having 1 to 30 carbon atoms; $R^1$, $R^2$, $R^3$, and $R^4$ are each independently selected from the group of H, branched alkyl, linear alkyl, cyclic alkyl, or alkaryl groups having 1 to 6 carbon atoms, with the proviso that one or more of the following apply: that $R^1$, $R^2$, $R^3$, and $R^4$ cannot all be H, the sum of carbon atoms in $R^1+R^2+R^3+R^4$ is less than or equal to about 8; x is from 1 to 20 inclusive when the sum of carbon atoms in $R^1+R^2+R^3+R^4$ is equal to 1 or x is an integer from 1 to 2 inclusive when the sum of carbon atoms in $R^1+R^2+R^3+R^4$ is equal to 2 to 8; and y is an integer from 0 to 99 and (ii) wherein the anionic surfactant is one or more alkyl diphenyloxide (di) sulfonate compound having the formula:

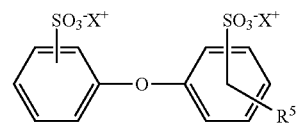

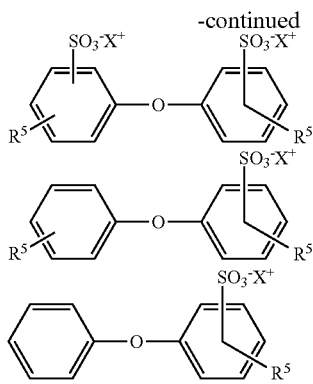

where $R^5$ is a $C_3$ to $C_{20}$ alkyl radical and X is H, an alkali metal, alkaline earth metal, or ammonium.

One embodiment of the present invention is a method for recovering oil form a reservoir formation that is penetrated by at least one injection well and one production well, comprising (a) selecting a foam-forming composition comprising a nonionic surfactant and an anionic surfactant as disclosed herein above (b) forming a stable foam of $CO_2$ and water in the reservoir with the surfactant foaming composition; (c) lowering a viscosity of oil in the reservoir formation; and (d) producing oil having the lowered viscosity from the reservoir formation.

In one embodiment of the method disclosed herein above, forming the stable foam includes injecting the surfactant with at least one of $CO_2$ and water into the reservoir formation via the injection well, preferably where injecting the foam-forming composition includes injecting the nonionic surfactant with $CO_2$ into the reservoir formation and the anionic surfactant with the water into the reservoir formation or where injecting the foam-forming composition includes injecting the nonionic surfactant and the anionic surfactant with the water into the reservoir formation or where injecting the foam-forming composition includes injecting the nonionic surfactant with both $CO_2$ and water into the reservoir formation and the anionic surfactant with the water into the reservoir formation.

In another embodiment of the method disclosed herein above, the foam-forming composition further includes at least one additive selected from a group consisting of a corrosion inhibitor, a scale inhibitor, and mixtures thereof.

In one embodiment of the composition and/or the method disclosed herein above, the alcohol-alkoxylate is selected from the group including: $(C_8H_{17}O)-(C_3H_6O)_5-(C_2H_4O)_9-H$, $(C_8H_{17}O)-(C_3H_6O)_5-(C_2H_4O)_{11}-H$, $(C_8H_{17}O)-(C_3H_6O)_5-(C_2H_4O)_{14}-H$, $(C_8H_{17}O)-(C_3H_6O)_9-(C_2H_4O)_9-H$, $(C_6H_{13}O)-(C_3H_6O)_5-(C_2H_4O)_{11}-H$, $(C_6H_{13}O)-(C_3H_6O)_5-(C_2H_4O)_{13}-H$, $(C_9H_{19}O)-(C_3H_6O)_4-(C_2H_4O)_8-H$, and mixtures thereof.

In one embodiment of the composition and/or the method disclosed herein above, the alkyl diphenyloxide (di)sulfonate is selected from the group: butyl diphenyloxide disulfonic acid sodium, hexyl diphenyloxide disulfonic acid sodium, decyl diphenyloxide disulfonic acid sodium, dodecyl diphenyloxide disulfonic acid sodium, hexadecyl diphenyloxide disulfonic acid sodium, dodecyl diphenyloxide disulfonic acid potassium, hexyl diphenyloxide disulfonic acid lithium, decyl diphenyloxide disulfonic acid ammonium, dodecyl diphenyloxide disulfonic acid ammonium, dodecyl diphenyloxide disulfonic acid lithium, and mixtures thereof.

DETAILED DESCRIPTION OF THE PREFERRED EMBODIMENTS

Figure 1:
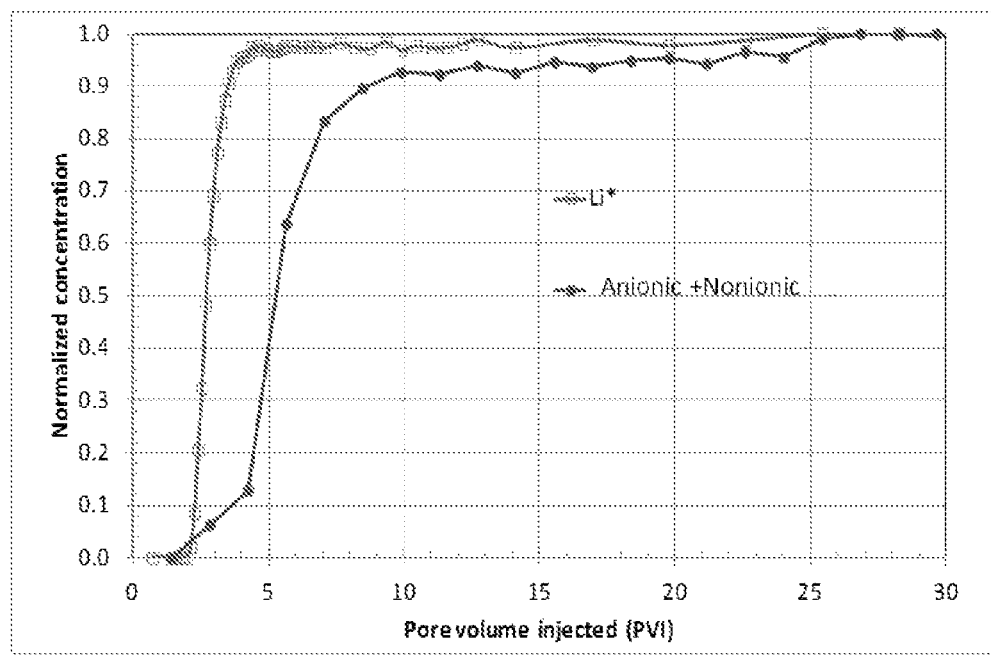
FIG. 1 is an adsorption breakthrough profile for Example 1.

The present invention includes a foam-forming composition for use in enhanced oil recovery, and a method of using said foam-forming composition for recovering oil. The composition of the present invention comprises a nonionic surfactant and an anionic surfactant, where the foam-forming composition promotes a formation of a stable foam formed of a gas and water. The foam-forming compositions of the present invention demonstrate a reduced tendency to adsorb in rock formations, especially sandstone formations, improved brine and temperature tolerance, and enhanced stability in the presence of oil.

Any gas is suitable for the method of the present invention including carbon dioxide ($CO_2$), nitrogen ($N_2$), methane ($CH_3$), flue gas and the like or mixtures of hydrocarbons such as methane with any of ethane, propane, or butane, flue gas and the like. The preferred gas is $CO_2$.

The choice of water for use in the method of the present invention is typically the produced water, e.g., from the reservoir, but the source may be different, based upon the requirements of the reservoir to be treated, economics, and compatibility of the composition upon dilution, for example fresh water, aquifer water, or reservoir brine produced from the well. This invention will find particular applicability with brines having a total dissolved solids (TDS) content of from 0 up to 18 weight percent, preferably with 0 up to 15, and more preferably 0 up to 12 weight percent.

For the various embodiments of the method of the present invention, the nonionic surfactant that can be used to create a stable foam has solubility in $CO_2$ and can be conveniently pumped down-hole in either the water, the $CO_2$, or in both the water and $CO_2$. The nonionic surfactant can be identified by their $CO_2$-philicity. The "$CO_2$-philicity" has been found to be based on the dominant factors of the hydrophobic-hydrophobic interactions of the tails of the surfactants as well as the hydrophobic-carbon dioxide interactions of the surfactant tails in the carbon dioxide. Therefore, the $CO_2$-philicity refers to a value that can be determined and assigned to a compound, e.g., a surfactant, which references how well the compound is solvated in the carbon dioxide phase.

The $CO_2$-philicity of a surfactant, as used herein, is defined as the negative difference of a first chemical potential of the surfactant's hydrophobic end in carbon dioxide ($\mu CT$) and a second chemical potential of the surfactant's hydrophobic end in its liquid form ($\mu TT$), shown below.

$$CO_2\text{-philicity}=-(\mu CT-\mu TT)$$

The chemical potential of a substance in a solvent or solvent mixture defines its stability in that solvent or solvent mixture, and is a measure of how much free enthalpy (or energy) of a system changes when a number of molecules of one species is added or removed while keeping the number of the other molecules, along with the temperature and pressure, constant. Thus, the first chemical potential ($\mu CT$) describes the interaction of the surfactant's hydrophobic tail with carbon dioxide and the second chemical potential ($\mu TT$) describes the interaction of the surfactant's hydrophobic tail with another of the surfactant's hydrophobic tail in the liquid form of the surfactant.

For the various embodiments, models developed as a part of the present invention are used to calculate the chemical potentials $\mu CT$ and $\mu TT$. In embodiments of the present invention, software packages, such as COSMOtherm (COSMOlogic, GmbH&CoKG), can be used to implement the models of the present invention, where the results can be used in parallel to determine the chemical potentials.

For example, to determine the second chemical potential of the surfactant's hydrophobic tail with itself, a first model is created to represent the structure of the surfactant's hydrophobic tail. Next, a second model is created to take the structure of the surfactant's hydrophobic tail from the first model and repeat the structure from the first model over and over until a continuum of the structure is created. From this, a "liquid" of the surfactant structure is created in the second model. A third model is then created to take the structure of the surfactant's hydrophobic tail from the first model and insert it into the "liquid," or continuum, from the second model, and the amount of energy that it takes to then remove the structure of the surfactant's hydrophobic tail (the first model) from the liquid (the second model) represents the second chemical potential ($\mu TT$) of the surfactant's hydrophobic tail with itself. For a good discussion of $CO_2$-philicity and how to calculate, see U.S. Pat. No. 8,973,668 which is incorporated by reference herein in its entirety.

Based on the discussion provided herein, embodiments of the present invention can include nonionic surfactants with a lower limit for the $CO_2$-philicity of at least 1.5. In an additional embodiment, the present invention can include nonionic surfactants with a lower limit for the $CO_2$-philicity of at least about 1.6. In another embodiment, the present invention can include nonionic surfactants with a lower limit for the $CO_2$-philicity of at least 1.7. In some embodiments, the $CO_2$-philicity of the nonionic surfactants can have an upper limit of no greater than 5.0. In an additional embodiment, the present invention can include nonionic surfactants with an upper limit for the $CO_2$-philicity of no greater than 4.5.

The foam-forming composition employed in the present invention comprises a nonionic surfactant, for example an alcohol-alkoxylate such as those disclosed in U.S. Pat. No. 8,973,668. Suitable alcohol-alkoxylates have the following formula:

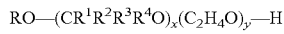

RO—$(CR^1R^2R^3R^4O)_x(C_2H_4O)_y$—H where R is selected from the group of linear alkyl, branched alkyl, cyclic alkyl, and alkaryl groups having 1 to 30 carbon atoms, preferably 3 to 16 carbons; $R^1$, $R^2$, $R^3$, and $R^4$ are each independently selected from the group of H, branched alkyl, linear alkyl, cyclic alkyl, or alkaryl groups having 1 to 6 carbon atoms; with the proviso that one or more of the following apply: that $R^1$, $R^2$, $R^3$, and $R^4$ cannot all be H, the sum of carbon atoms in $R^1+R^2+R^3+R^4$ is less than or equal to about 8;

x is from 1 to 20 inclusive when the sum of carbon atoms in $R^1+R^2+R^3+R^4$ is equal to 1; (e.g., the alkylene oxide group is propylene oxide); x is an integer from 1 to 5 inclusive when the sum of carbon atoms in $R^1+R^2+R^3+R^4$ is equal to 2 to 8 (e.g., the alkylene oxide group is butylene oxide or isobutylene oxide); and y is an integer from 0 to 99 inclusive.

For the various embodiments, specific examples of the alcohol-alkoxylate of the present invention can be selected from a group including, but not limited to, $(C_8H_{17}O)$—$(C_3H_6O)_5$—$(C_2H_4O)_9$—H, $(C_8H_{17}O)$—$(C_3H_6O)_5$—$(C_2H_4O)_{11}$—H, $(C_8H_{17}O)$—$(C_3H_6O)_5$—$(C_2H_4O)_{14}$—H, $(C_8H_{17}O)$—$(C_3H_6O)_9$—$(C_2H_4O)_9$—H, $(C_6H_{13}O)$—$(C_3H_6O)_5$—$(C_2H_4O)_{11}$—H, $(C_6H_{13}O)$—$(C_3H_6O)_5$—$(C_2H_4O)_{13}$—H, $(C_9H_{19}O)$—$(C_3H_6O)_4$—$(C_2H_4O)_8$—H, and mixtures thereof. For these specific examples, the R group, as provided herein, can be one of a linear alkyl or branched alkyl as is possible for the given formula. For the various embodiments, each of these specific examples of the nonionic alcohol-alkoxylate surfactants include ethylene oxide (EO) and propylene oxide (PO) groups, as discussed herein, where the $CO_2$-philicity is in the range of about 1.5 to about 5.0, from about 1.6 to about 4.5, or from about 1.7 to about 4.0, where a $CO_2$-philicity in these ranges would be useful for promoting the formation of a stable foam of carbon dioxide and water.

The nonionic surfactant is added to the water and/or the $CO_2$, for example at the well head, such that the amount of nonionic surfactant in the water and/or $CO_2$ pumped down-hole is from 0.0001 to 2 weight percent. Preferably, the amount of nonionic surfactant in the down-hole water and/or $CO_2$ is equal to or greater than 0.0001 weight percent, more preferably equal to or greater than 0.001 weight percent, more preferably equal to or greater than 0.01 weight percent, more preferably equal to or greater than 0.05 weight percent, and even more preferably equal to or greater than 0.08 weight percent. Generally, the amount of the nonionic surfactant is present in the water and/or $CO_2$ pumped down-hole in an amount equal to or less than 0.3 weight percent, preferably equal to or less than 0.2 weight percent.

The foam-forming composition employed in the present invention also includes one or more anionic surfactant, preferably an alkyl aryl-sulfonate compound which is present in the amount effective to increase the brine and/or temperature tolerance of the surfactant composition. Suitable alkyl aryl-sulfonate compounds are products based on alkylated diphenyl oxide mono- and di-sulfonates (mono- and di-sulfonates herein after referred to as (di)sulfonates). Preferred alkyl diphenyloxide (di)sulfonates may be a monoalkylated disulfonated diphenyl oxide, a dialkylated disulfonated diphenyl oxide, a monoalkylated monosulfonated diphenyl oxide, a dialkylated monosulfonated diphenyl oxides, or mixtures thereof. Preferred alkyl diphenyloxide (di)sulfonates comprise one or more of the following formulas:

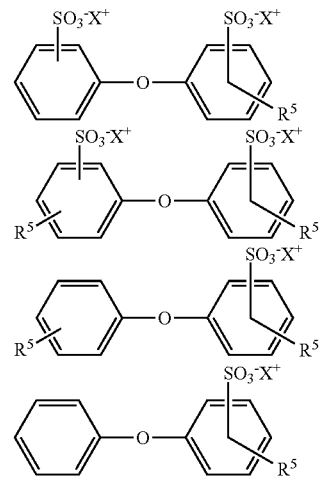

where $R^5$ is a $C_3$ to $C_{20}$ alkyl radical, preferably propyl, butyl, octyl, nonyl, decyl, or dodecyl, preferably $C_6$ to $C_{16}$, more preferably a $C_6$ to $C_{10}$ alkyl radical and X is H, an alkali metal, alkaline earth metal, or ammonium, preferably a monovalent or divalent cation, preferably sodium ion, potassium ion, lithium ion, or ammonium ion including ammonium, methyl ammonium, ethyl ammonium, dimethyl ammonium, methylethyl ammonium, trimethyl ammonium, dimethylbutyl ammonium, hydroxyethyl ammonium, and methylhydroxyethyl ammonium. Preferred alkyl aryl-disulfonate compounds are where $R^5$ is a $C_6$, $C_{10}$ or $C_{16}$ alkyl group with $C_6$ alkyl group being more preferred. Furthermore, X is preferably sodium.

Preferred alkyl aryl-disulfonates include butyl diphenyloxide disulfonic acid sodium, hexyl diphenyloxide disulfonic acid sodium, decyl diphenyloxide disulfonic acid sodium, dodecyl diphenyloxide disulfonic acid sodium, hexadecyl diphenyloxide disulfonic acid sodium, dodecyl diphenyloxide disulfonic acid potassium, hexyl diphenyloxide disulfonic acid lithium, decyl diphenyloxide disulfonic acid ammonium, dodecyl diphenyloxide disulfonic acid ammonium, dodecyl diphenyloxide disulfonic acid lithium, and mixtures thereof. More than one of the alkyl aryl-disulfonate compounds can also be employed in the foam-forming composition.

Preferred mixtures include certain of those commercial solutions available from The Dow Chemical Company under the DOWFAX™ tradenames, i.e., DOWFAX 3B2, DOWFAX 8390, DOWFAX C6L, DOWFAX C10L, DOWFAX 2A1.

Suitable alkyl aryl-disulfonate s of the present invention can be prepared by methods recognized in the art. For example, attention is directed towards U.S. Pat. No. 4,860,828 to Oswald et al. which is incorporated herein by reference.

The anionic surfactant is added to/diluted with the water, for example at the well head, such that the amount of anionic surfactant in the water pumped down-hole is from 0.0001 to 2 weight percent. Preferably, the amount of anionic surfactant in the down-hole water is equal to or greater than 0.0001 weight percent, more preferably equal to or greater than 0.001 weight percent, more preferably equal to or greater than 0.01 weight percent, more preferably equal to or greater than 0.05 weight percent, and even more preferably equal to or greater than 0.08 weight percent. Generally, the amount of the anionic surfactant is present in the water pumped down-hole in an amount equal to or less than 0.3 weight percent, preferably equal to or less than 0.2 weight percent.

In some embodiments, foam-forming compositions of the present invention may include other additives. For example, the composition may further include corrosion inhibitors, scale inhibitors, mixtures thereof, as well as other additives. In some embodiments, the total amount of the additives added to the compositions of the present disclosure is not greater than about 5 weight percent.

Embodiments of the present invention may also include a method for recovering oil from a reservoir formation penetrated by at least one injection well and one production well containing water and oil. The method embodiment of the present disclosure may be termed a gas flooding process, as discussed herein. Since gas flooding processes are typically a tertiary recovery process performed after water flooding, the hydrocarbons left in the reservoir formation tend to be in hard to reach areas. Also, most of the reservoir formation is filled with water from a water flooding procedure. As such, embodiments of the present disclosure include selecting the foam-forming composition of the present invention comprising an anionic surfactant and a nonionic surfactant and injecting the foam-forming composition with carbon dioxide and water into the reservoir formation via the injection well to form a stable foam formed of carbon dioxide and water in the reservoir formation, as discussed herein.

In some embodiments, the anionic surfactant is injected into the reservoir with the water and the nonionic surfactant is injected with $CO_2$ into the reservoir formation, where the reservoir formation contains water.

In some embodiments, the anionic surfactant and the nonionic surfactant are injected into the reservoir with water, and then carbon dioxide can be injected into the reservoir.

In some embodiments, the anionic surfactant is injected into the reservoir with the water and the nonionic surfactant is injected into the reservoir with both water and carbon dioxide, where the nonionic surfactant can be included both the carbon dioxide and the water.

The purpose of the foam formed can be to inhibit the flow of the carbon dioxide into that portion of the reservoir formation containing only residual oil. In other words, the foam can block the flow of carbon dioxide into portions of the reservoir formation where oil has been recovered using previously performed recovery processes. Therefore, the foam forces the carbon dioxide to drive the recoverable hydrocarbons from the less depleted portions of the reservoir formation toward the production well.

There are several ways of generating foam. For example, foam can be made before being injected into the reservoir formation by stirring water and the foam-forming composition and injecting it into the reservoir. Alternatively, the foam-forming composition can be introduced into the field with water and a $CO_2$ and the foam formed "in situ". Once the $CO_2$ hits the water in the reservoir formation and the foam-forming composition, the shearing forces can create foam in the reservoir formation. Other methods of forming foam within a reservoir formation are described in U.S. Pat. No. 4,380,266, which is incorporated in its entirety herein by reference.

As discussed herein, since typically the gas flooding process follows a water injection process, the reservoir formation already contains water when the methods of the present disclosure are begun. As such, the anionic surfactant and nonionic surfactant may migrate to the interface of carbon dioxide and water to form foam when the carbon dioxide with alone or with the nonionic surfactant is injected into the reservoir.

As discussed herein, the method of the present invention includes allowing the carbon dioxide in the stable foam to dissolve into the oil in the reservoir formation to provide a lowered viscosity of the oil and pumping the oil having the lowered viscosity from the reservoir.

In one embodiment of the method of using the foam-forming composition of the present invention for the enhanced recovery of oil, the anionic surfactant and the nonionic surfactant may be added to the aqueous down-hole diluent.

In another embodiment of the method of using the foam-forming composition of the present invention for the enhanced recovery of oil, the anionic surfactant may be added to the aqueous down-hole diluent and the nonionic surfactant may be added to the $CO_2$.

Moreover, although the composition of the oil-bearing formation is not critical to the present invention, it finds particular utility in sandstone reservoirs.

In one embodiment, the foam-forming composition of the present invention may be used in a the water-alternate-gas (WAG) method of recovering oil from a reservoir during alternating water/gas injection into said reservoir comprising the steps of: at least periodically injecting $CO_2$, water, and said foam-forming composition into a reservoir and contacting hydrocarbons in the reservoir with the foam and the gas so as to assist in the recovery of hydrocarbons from the reservoir.

In one embodiment, the foam-forming composition is injected in a production well for a desired amount of time with the intention of forming an oil tolerant foam near the production zone in order to reduce the gas influx into the production well, when the production well is turned back on in production mode.

EXAMPLES

The following examples are given to illustrate, but not limit, the scope of this invention. Unless otherwise indicated, all parts and percentages are by weight. Weight percent is the percentage of one compound included in a total mixture, based on weight. The weight percent can be determined by dividing the weight of one component by the total weight of the mixture and then multiplying by 100. Unless otherwise specified, all instruments and chemicals used are commercially available.

Dynamic adsorption experiments to evaluate the adsorption behavior of the surfactant formulations are performed in a Chandler Formation Response Tester (FRT 6100) core flood set up. Berea sandstone cores 6 inch in length and 1.5 inch in diameter are used. The cores are held inside a rubber sleeve which is then inserted into a Hassler-type core holder. A confining pressure, in excess of 500 psi over the core line pressure, is applied externally on the sleeve to keep the cores locked in place. A hydraulic booster pump (Haskel MS-71) is used to apply the confining pressure. Chandler white mineral oil is used as the hydraulic fluid. The experiments are performed with the core temperature set at 52° C. The back-pressure regulator is set at 1750 psi. The flow rate is kept a 0.62 ml/min.

Figure 2:
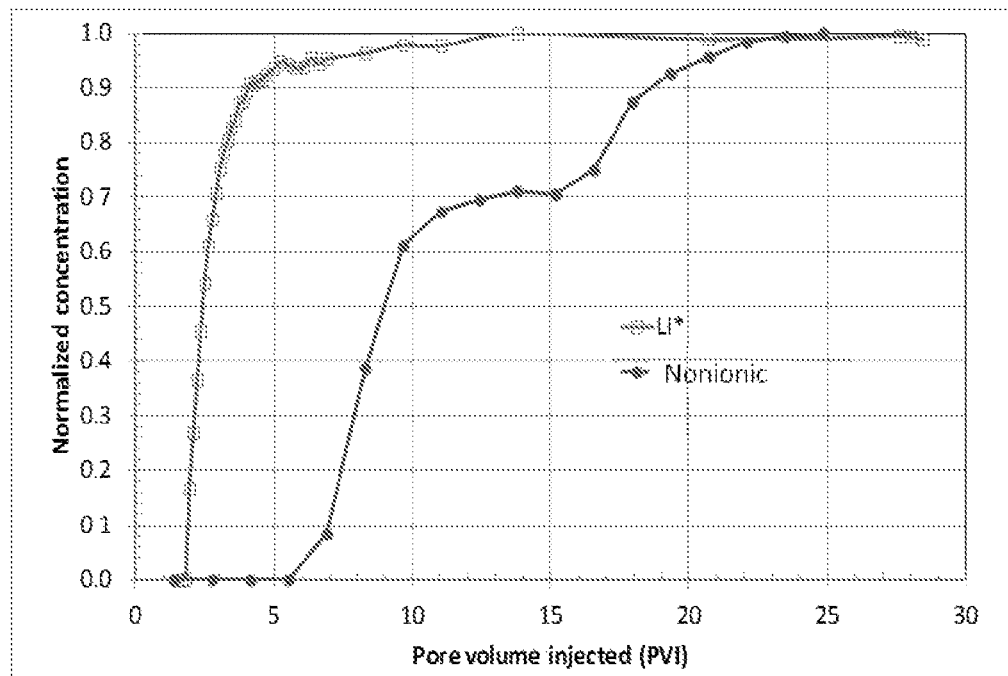
FIG. 2 is an adsorption breakthrough profile for Comparative Examples A.

An elution profile of a non-adsorbing tracer through the system is determined using a synthetic brine comprising 1 percent of a 1 percent LiCl solution. The LiCl served as the non-adsorbing tracer in experiment. The concentration of the Li ion is detected in the effluent by Ion Chromatography, thus generating the elution profile of a non-adsorbing component in the reservoir rock. Surfactant formulations at concentrations described in Table 1 is steadily injected. The nonionic surfactant concentration in the effluent is determined using liquid chromatography analysis and the surfactant elusion profile is generated. The area between the two curves increases with the amount of surfactant retained in the core during the core flood experiment and is a measure of the net amount of surfactant adsorbed. FIG. 1 and FIG. 2 show that the adsorption of the nonionic surfactant on sandstone is significantly reduced when used in combination with an anionic surfactant.

Core flood experiments are also performed to determine the mobility reduction factor (MRF), which is defined as the ratio of the mobility of $CO_2$ in the absence of surfactant to the mobility of $CO_2$ in the presence of surfactant according to the following formula:

$$MRF = \frac{\text{Mobility of gas without surfactant}}{\text{Mobility of gas with surfactant}} = \frac{(QL/A\Delta P)_{no\text{-}surfactant}}{(QL/A\Delta P)_{surfactant}}$$

where Q is the volumetric flow rate, L is the length of the core, A is the cross-sectional area of the core and $\Delta P$ is the pressure drop across the core.

At identical flow conditions, the mobility reduction factor (MRF) can be estimated by the ratio of the $$MRF = \frac{\Delta P_{surfactant}}{\Delta P_{no\text{-}surfactant}}$$

i.e., the ratio of the pressure drops in presence of surfactant to that in absence of surfactant, at identical flow conditions. Thus an increase in foam strength means increased resistance (higher $\Delta P$) to gas flow, leading to an increase in MRF.

Core flooding experiments are performed in a core flooding set-up (FRT 6100) procured from Chandler Engineering. All core-flood experiments are performed in co-injection mode. Brine flow in the rig was controlled by a liquid QUIZIX QX series pump. $CO_2$ is pumped in by a dual cylinder QUIZIX Q5000 series pump. Differential pressure transducers are used to measure the pressure drop across the cores. The pressure at the cell outlet is controlled by a backpressure regulator. The back-pressure regulator used is a dome type regulator which provided more precise control over liquid flow, especially when two phases are flowing. Berea sandstone cores 6 inch in length and 1.5 inch in diameter are used for the experiment. The cores are held inside a rubber sleeve which is then inserted into the Hassler-type core holder. A confining pressure, in excess of 500 psi over the core line pressure, is applied externally on the sleeve to keep the cores locked in place. A hydraulic booster pump (Haskel MS-71) is used to apply the confining pressure. Chandler white mineral oil is used as the hydraulic fluid. The experiments are performed with the core temperature set at 52° C. The back-pressure regulator was set at 1750 psi. The total flow rate (brine, surfactant and $CO_2$) is kept a 0.62 ml/min and $CO_2$ comprised 85% of the total flow.

Cloud point is the temperature at which a previously clear, single-phase substance becomes cloudy because of the appearance of a second phase. The cloudiness lowers the transmittance of light passing through the sample. All cloud point measurements are performed according to ASTM D 2024. Transmittance is measured using a Mettler FP900 Cloud Point System; calibration is performed using benzophenone. Samples are prepared as 1 wt % surfactant in water. The Cloud Point System gradually increased the temperature at a rate of 3° C./min from 10° C. Cloud point results are given in Table 1.

The compositions for the Examples and Comparative Examples, net adsorptions, mobility reduction factors, and cloud points are listed in Table 1.

In the Tables below:

"LiCl" is a 1 wt % lithium chloride non-adsorbing tracer solution;

"Nonionic" is a nonionic surfactant having the formula: $(C_8H_{17}O)$—$(C_3H_6O)_5$—$(C_2H_4O)_{14}$—H;

"Anionic" is the anionic surfactant hexadecyl diphenyloxide disulfonic acid sodium;

"Nonyl-1" is a nonionic surfactant having the formula: linear $(C_9H_{19}O)$—$(C_3H_6O)_2$—$(C_2H_4O)_{10}$—H;

"Hexyl" is a nonionic surfactant having the formula: $(C_6H_{13}O)$—$(C_3H_6O)_2$—$(C_2H_4O)_{10}$—H;

"Nonyl-2" is a nonionic surfactant having the formula: branched $(C_9H_{15}O)$—$(C_3H_6O)_2$—$(C_2H_4O)_{10}$—H; and "SDS" is sodium dodecyl sulfate.

TABLE 1

| | LiCl, wt % | Nonionic, ppm | Anionic, ppm | Adsorption, mg/gm-rock | MRF | Cloud Point, ° C. |
|---|---|---|---|---|---|---|
| Com. Ex. B | 1 | 1,400 | | 1.54 | 30.5 | 78.8 |
| Ex. 1 | 1 | 1,400 | 2,500 | 0.48 | 63.8 | >100 |

The breakthrough profiles for Example 1 and Comparative Examples are shown in FIG. 1 and FIG. 2, respectively.

Adsorption versus temperature in a 2% sodium chloride solution on silica is determined. For each test, a SEP-PAK™ Plus Column (Waters Corporation WAT020520) is prepared by flushing water or brine solution through the column to saturate the silica bed. The column is then attached to a 100 mL syringe into which the surfactant solution is loaded. The syringe is placed on a syringe pump and the surfactant solution is pumped through the column at a typical rate of 3 mL/min The timer is started as soon as liquid started emerging from column. Samples are collected at timed intervals and analyzed via HPLC. HPLC data is collected using an Agilent 1200 Series LC with an ELSD (Evaporating Light Scattering Detector) attached. The column used for the analysis is a ZORBAX SB-C3 Solvent Saver, 3.0×150 mm, 5 μm from Agilent Technologies. The mobile phases used are ultra pure D.I. water prepared via Millipore filtration (Eluent A) and LC grade acetonitrile from Fisher Scientific (Eluent B). Ambient conditions are 25° C. and non-ambient conditions are 50° C. For non-ambient conditions, a column heater is wrapped around the syringes and temperature is controlled using a thermocouple after exiting the syringe column. The adsorption (% of nonionic component adsorbed) versus temperature in a 2% sodium chloride solution on silica results are listed in Table 2.

TABLE 2

| | Nonionic, ppm | Anionic, ppm | Nonyl-1, ppm | Hexyl, ppm | Nonly-2, ppm | Temperature, @ 25° C. | Temperature, @ 50° C. |
|---|---|---|---|---|---|---|---|
| Com. Ex. A | 1,400 | | | | | 77 | 86 |
| Ex. 1 | 1,400 | 2,500 | | | | 37 | 51 |
| Ex. 2 | | 2,500 | 1,400 | | | 34 | |
| Ex. 3 | | 2,500 | | 1,400 | | 19 | |
| Ex. 4 | | 2,500 | | | 1,400 | 59 | |

The percent adsorption on silica for Example 2 and Comparative Example C are given in Table 3.

Formulation stability versus degree of salinity is determined by preparing samples in 100 mL glass vials and visually assessing the stability of the formulations across various salt loading qualitatively. Precipitation and turbidity are noted with the onset of instability and the observed results given in Table 3.

TABLE 3

| | Nonionic, ppm | Anionic, ppm | SDS, ppm | % Adsorption on Silica, % NaCl (wt/wt), appearance | | | |
|---|---|---|---|---|---|---|---|
| | | | | 2 | 4 | 6 | 8 |
| Com. Ex. B | 1,400 | | 2,500 | 50, clear | 60, clear | 64, cloudy | precipitate |
| Ex. 2 | 1,400 | 2,500 | | 37, clear | 39, clear | 41, clear | 44, clear |

What is claimed is:

1. A foam-forming composition for use in an enhanced oil recovery process consisting essentially of:
   a nonionic surfactant and an anionic surfactant,
   (i) wherein the nonionic surfactant is one or more alcohol-alkoxylate selected from the group consisting of $(C_8H_{17}O)$—$(C_3H_6O)_5$—$(C_2H_4O)_9$—H, $(C_8H_{17}O)$—$(C_3H_6O)_5$—$(C_2H_4O)_{11}$—H, $(C_8H_{17}O)$—$(C_3H_6O)_5$—$(C_2H_4O)_{14}$—H, and mixtures thereof;
   (ii) wherein the anionic surfactant is one or more alkyl diphenyloxide (di)sulfonate compound having the formula:

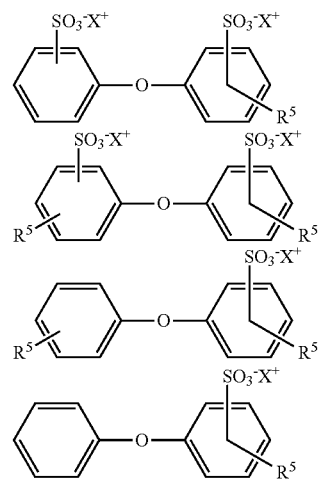

where $R^5$ is a $C_3$ to $C_{20}$ alkyl radical, and X is H, an alkali metal, alkaline earth metal, or ammonium.

2. A method for recovering oil form a reservoir formation that is penetrated by at least one injection well and one production well, comprising
   (a) selecting a foam-forming composition consisting essentially of a nonionic surfactant and an anionic surfactant
   (i) wherein the nonionic surfactant is one or more alcohol-alkoxylate selected from the group consisting of $(C_8H_{17}O)-(C_3H_6O)_5-(C_2H_4O)_9-H$, $(C_8H_{17}O)-(C_3H_6O)_5-(C_2H_4O)_{11}-H$, $(C_8H_{17}O)-(C_3H_6O)_5-(C_2H_4O)_{14}-H$, and mixtures thereof;

(ii) wherein the anionic surfactant is one or more alkyl diphenyloxide (di)sulfonate compound having the formula:

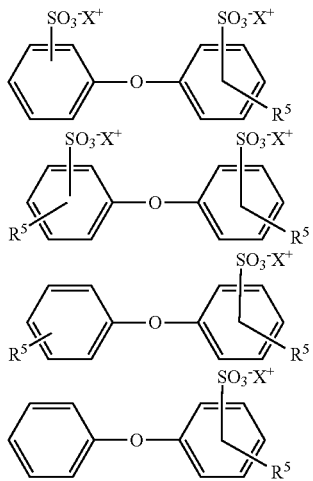

where $R^5$ is a $C_3$ to $C_{20}$ alkyl radical, and X is H, an alkali metal, alkaline earth metal, or ammonium (b) forming a stable foam of $CO_2$ and water in the reservoir with the surfactant foaming composition;

(c) lowering a viscosity of oil in the reservoir formation; and (d) producing oil having the lowered viscosity from the reservoir formation.

3. The method of claim 2, where forming the stable foam includes injecting the surfactant with at least one of $CO_2$ and water into the reservoir formation via the injection well.

4. The method of claim 3, where injecting the foam-forming composition includes injecting the nonionic surfactant with $CO_2$ into the reservoir formation and the anionic surfactant with the water into the reservoir formation.

5. The method of claim 3, where injecting the foam-forming composition includes injecting the nonionic surfactant and the anionic surfactant with the water into the reservoir formation.

6. The method of claim 3, where injecting the foam-forming composition includes injecting the nonionic surfactant with both $CO_2$ and water into the reservoir formation and the anionic surfactant with the water into the reservoir formation.

7. The method of claim 2 wherein the alkyl diphenyloxide (di)sulfonate is selected from the group: butyl diphenyloxide disulfonic acid sodium, hexyl diphenyloxide disulfonic acid sodium, decyl diphenyloxide disulfonic acid sodium, dodecyl diphenyloxide disulfonic acid sodium, hexadecyl diphenyloxide disulfonic acid sodium, dodecyl diphenyloxide disulfonic acid potassium, hexyl diphenyloxide disulfonic acid lithium, decyl diphenyloxide disulfonic acid ammonium, dodecyl diphenyloxide disulfonic acid ammonium, dodecyl diphenyloxide disulfonic acid lithium, and mixtures thereof.

8. The method of claim 2, where foam-forming composition further includes at least one additive selected from a group consisting of a corrosion inhibitor, a scale inhibitor, and mixtures thereof.

\* \* \* \* \*